US011118561B2

(12) United States Patent
Randall (10) Patent No.: US 11,118,561 B2
(45) Date of Patent: Sep. 14, 2021

(54) MODULAR WIND TURBINE ROTOR BLADE (71) Applicant: Vestas Wind Systems A/S, Aarhus N. (DK)

(72) Inventor: Stephen Randall, Isle of Wight (GB)

(73) Assignee: Vestas Wind Systems A/S, Aarhus N. (DK)

( * ) Notice: Subject to any disclaimer, the term of this patent is extended or adjusted under 35 U.S.C. 154(b) by 326 days.

(21) Appl. No.: 15/034,733

(22) PCT Filed: Nov. 4, 2014

(86) PCT No.: PCT/DK2014/050360
§ 371 (c)(1),
(2) Date: May 5, 2016

(87) PCT Pub. No.: WO2015/067271
PCT Pub. Date: May 14, 2015

(65) Prior Publication Data
US 2016/0281680 A1 Sep. 29, 2016

(30) Foreign Application Priority Data
Nov. 5, 2013 (GB) ..................................... 1319520

(51) Int. Cl.
*F03D 1/06* (2006.01)
(52) U.S. Cl.
CPC ...... *F03D 1/0675* (2013.01); *F05B 2240/302* (2013.01); *F05B 2280/6003* (2013.01); *Y02E 10/72* (2013.01)
(58) Field of Classification Search
CPC ...... F03D 1/065; F03D 1/0675; F03D 1/0683; F03D 13/40; F03D 13/10; F05B 2280/6003; F05B 2240/302; Y02E 10/721
See application file for complete search history.

(56) References Cited

U.S. PATENT DOCUMENTS 4,474,536 A * 10/1984 Gougeon .............. F03D 1/0675
144/346
5,876,553 A 3/1999 Kaiser
(Continued)

FOREIGN PATENT DOCUMENTS

| CN | 1915649 A | 2/2007 |
| CN | 102116253 A | 7/2011 |

(Continued)

OTHER PUBLICATIONS

Intellectual Property Office, Search and Examination Report dated May 28, 2014 in Application No. GB1319520.1.
(Continued)

*Primary Examiner* — David E Sosnowski
*Assistant Examiner* — Wayne A Lambert
(74) *Attorney, Agent, or Firm* — Wood Herron & Evans LLP (57) ABSTRACT A modular wind turbine blade is described. The blade has at least a first blade module and a second blade module connected to end to end. An interface is defined between the respective modules. The blade further comprises at least one longitudinally extending spar structure that forms part of the outer shells of the first and second blade modules when the modules are connected. The or each spar structure is substantially continuous and extends across the interface between the first and second blade modules when the modules are connected. The or each spar structure is integrated with the first blade module and the spar structure is folded or coiled to facilitate transportation of the module. The second blade module includes channels defined in the outer shell for receiving the or each spar structure when the modules are connected. In this way the spar structures also form part of the outer shell of the second module. A method (Continued)

of assembling the modular blade and a method of installing a wind turbine having a modular blade are also described.

26 Claims, 6 Drawing Sheets

(56) References Cited

U.S. PATENT DOCUMENTS

| | | | |
|---|---|---|---|
| 7,740,453 B2 * | 6/2010 | Zirin | F03D 1/0675 416/226 |
| 7,922,454 B1 | 4/2011 | Riddell | |
| 8,167,569 B2 * | 5/2012 | Livingston | F03D 1/0675 416/1 |
| 8,171,633 B2 | 5/2012 | Zirin et al. | |
| 8,177,515 B2 * | 5/2012 | Hibbard | F03D 1/0675 416/226 |
| 8,231,351 B2 * | 7/2012 | Nies | F03D 1/065 416/146 R |
| 8,764,401 B2 * | 7/2014 | Hayden | F03D 1/0675 416/213 R |
| 9,297,357 B2 * | 3/2016 | Busbey | F03D 1/0641 |
| 9,394,881 B2 * | 7/2016 | Obrecht | B21D 53/78 |
| 2006/0127222 A1 * | 6/2006 | Arelt | F03D 1/0675 416/224 |
| 2006/0225278 A1 * | 10/2006 | Lin | F03D 13/10 29/889.72 |
| 2007/0025856 A1 * | 2/2007 | Moroz | F03D 1/0633 416/223 R |
| 2007/0036659 A1 * | 2/2007 | Hibbard | B29C 66/1282 416/233 |
| 2007/0189903 A1 | 8/2007 | Eyb | |
| 2007/0253824 A1 * | 11/2007 | Eyb | F03D 1/0675 416/223 R |
| 2008/0181781 A1 * | 7/2008 | Livingston | F03D 1/0675 416/223 R |
| 2009/0155084 A1 * | 6/2009 | Livingston | B29C 65/54 416/223 R |
| 2010/0132884 A1 | 6/2010 | Baehmann et al. | |
| 2010/0135796 A1 * | 6/2010 | Kavala | F03D 1/0675 416/1 |
| 2010/0304170 A1 * | 12/2010 | Frederiksen | B29C 65/40 428/542.8 |
| 2010/0314028 A1 * | 12/2010 | Hedges | B29C 70/083 156/93 |
| 2011/0091326 A1 * | 4/2011 | Hancock | F03D 1/0675 416/225 |
| 2011/0135485 A1 | 6/2011 | Wang | |
| 2011/0158788 A1 * | 6/2011 | Bech | F03D 1/0675 415/1 |
| 2014/0348659 A1 * | 11/2014 | Stewart | F03D 1/0675 416/229 R |
| 2015/0152839 A1 * | 6/2015 | Busbey | F03D 1/0675 416/132 B |
| 2016/0369771 A1 * | 12/2016 | Feigl | F03D 13/10 |

FOREIGN PATENT DOCUMENTS

| | | |
|---|---|---|
| DE | 10014376 A1 | 7/2001 |
| DE | 102008055539 A1 | 6/2009 |
| EP | 2208885 A2 | 7/2010 |
| EP | 2264310 A2 | 12/2010 |
| EP | 2746573 A2 | 6/2014 |
| FR | 1387857 A | 2/1965 |
| GB | 2497578 A | 6/2013 |
| WO | 2010023299 A2 | 3/2010 |
| WO | 2010065928 A1 | 6/2010 |
| WO | 2011088835 A2 | 7/2011 |
| WO | 2013087078 A1 | 6/2013 |

OTHER PUBLICATIONS

European Patent Office, International Search Report and Written Opinion dated Jan. 27, 2015 in International Patent Application No. PCT/DK2014/050360.
European Patent Office, Examination Report in EP 14799336.4, dated Nov. 16, 2017.
Government of India, Examination Report in in Application No. 201617018891, dated Dec. 24, 2019.
The State Intellectual Property Office of China, First Notification of Office Action in CN Application No. 201480070862.X, dated Feb. 3, 2017.
The State Intellectual Property Office of China, 2nd Notification of Office Action in CN Application No. 201480070862.X, dated Nov. 1, 2017.

* cited by examiner

MODULAR WIND TURBINE ROTOR BLADE

BACKGROUND

The present invention relates generally to wind turbine rotor blades and in particular to a modular rotor blade for a wind turbine.

Modern wind turbines are designed and manufactured to capture increasingly more energy from the wind to generate power. One way of increasing the energy capture of a wind turbine is to increase the swept area of the rotor blades, which means increasing the length of the rotor blades.

In general, large wind turbines are assembled on site from components that are transported to the site. Typical components of a wind turbine include a plurality of rotor blades, a rotor hub, a nacelle and a tower. The site may be remote and difficult to access, which makes transportation of large components, in particular the long rotor blades, problematic. To resolve this problem, the rotor blades may be divided into two or more modules that are easier to transport, and which are connected together on site.

In use, rotor blades experience extremely high stresses, which can cause stress concentrations to form at the joints between the modules of modular rotor blades due to discontinuities in the structure at the joints. These stress concentrations may result in damage to the modular rotor blades, for example cracks which require repairs and may reduce the lifespan of the modular rotor blades.

The individual modules of modular rotor blades are typically either bolted together, or bonded together using adhesive. These methods of joining the rotor blade modules generally comprise providing additional reinforcements around the joint for support and to reduce stress concentrations. For example, flanges, plates or sleeves may be provided at or around the joint. However, these joining methods tend to increase the weight of the rotor blades and add significant complexity to their design, manufacture and assembly.

Against this background, the present invention aims to provide an improved modular wind turbine rotor blade.

SUMMARY OF THE INVENTION

According to a first aspect of the present invention, there is provided a modular wind turbine blade comprising: a first blade module and a second blade module for connection end to end such that an interface is defined between the respective modules, each module having an outer shell; and at least one longitudinally extending spar structure forming part of the respective outer shells of the first and second blade modules when the modules are connected; wherein the or each spar structure is continuous and extends across the interface between the first and second blade modules when the modules are connected.

Whereas the reinforcing members of prior art modular blades generally include a joint at the interface between the blade modules, the main reinforcing member in the present invention is advantageously continuous across the interface. Accordingly, the or each spar structure in the present invention serves to reinforce the joint between the blade modules. Advantageously, and in contrast to prior art modular blades, the or each spar structure of the present invention preferably contains no joints, and hence the structural integrity of the spar structure, and hence the structural integrity of the blade, is not comprised by the modular structure of the blade. In preferred embodiments of the invention the or each spar structure extends along the majority of the length of the blade.

Joining the modules together by means of a continuous spar structure results in a more simple and more robust joint than prior art joints described by way of the background. There is also no weight penalty with this method of joining the blade, whereas prior art joining methods generally require additional components to create and reinforce the joint.

The or each spar structure is preferably integrated with the first blade module before the blade modules are connected together. In preferred embodiments of the invention the or each spar structure is integrally moulded with the outer shell of the first blade module. Alternatively, the spar structure may be bonded or otherwise integrated with the outer shell.

A particularly advantageous feature of the present invention is that the or each spar structure may be folded or coiled to facilitate transportation before the blade modules are connected together. The spar structure is advantageously relatively flexible before it is integrated with the second blade module and this allows it conveniently to be folded or coiled. Folding or coiling the spar structure reduces the size of the blade module, which allows the module to be transported more easily. It also serves to protect the spar structure during transit.

In order to assemble the modular blade, the first and second modules are arranged end to end and the or each spar structure is unfolded or uncoiled and then bonded to the second blade module.

In preferred embodiments of the present invention, the first blade module is an inboard module having an inboard end adapted for connection to a wind turbine hub. The second blade module is preferably an outboard module for location radially outwards from the inboard module. The second blade module preferably comprises a blade tip or is adapted for connection to a blade tip. In other embodiments of the invention, the modular blade may comprise more than two modules.

The spar structures generally decrease in thickness moving from the root of the blade towards the tip. It is therefore advantageous to integrate the inboard sections of the spar structures with the inboard module during manufacture as this leaves the outboard sections of the spar structures free. The outboard sections are relatively thin and flexible and so can be coiled or folded more easily than the inboard sections.

The thickness is measured in a direction perpendicular to the spanwise (from root to tip) and the chordwise (from leading edge to trailing edge) directions.

The outer shell of the second blade module preferably has one or more longitudinally extending channels or grooves in which the or each spar structure is respectively received when the blade modules are connected together. The channels conveniently serve to locate the spar structures, which facilitates the assembly process as the or each spar structure can conveniently be unfolded or uncoiled into a corresponding channel. The channels also facilitate accurate relative alignment between the respective modules.

To further facilitate alignment, there is preferably a tight fit between the spar structures and the channels.

The or each channel preferably has a depth such that when the or each spar structure is received in the corresponding channel, the or each spar structure is substantially flush with an outer surface of the second blade module. The spar structures are bonded in place in the channels by means of adhesive or resin infusion. Once bonded, the spar structures form an integral part of the outer shell of the second module.

Preferably the blade comprises one or more spar structures on a windward side of the blade and one or more spar structures on a leeward side of the blade, the or each windward spar structure being located substantially opposite the or each leeward spar structure. In a particularly preferred embodiment, the modular blade comprises a first pair of said spar structures spaced apart from one another in a chordwise direction on the windward side of the blade and a second pair of said spar structures spaced apart in a chordwise direction on the leeward side of the blade. One or more shear webs are preferably located inside the blade and are connected between opposed spar structures.

The or each spar structure may comprise one or more strips of fibrous reinforcing material. Carbon fibres are particularly preferred as the reinforcing material as these have a high strength to weight ratio. Preferably the or each spar structure comprises a stack of strips of fibrous reinforcing material. The strips are preferably formed in a pultrusions process, in which unidirectional fibres are drawn through a resin bath and then through a pultrusions die. The pultruded strips may have a thickness of a few millimetres. The number of strips in the stack preferably varies along the length of the or each spar structure, and preferably the number of strips reduces along the length of the stack moving from a middle of the blade towards both a root end of the blade and a tip end of the blade. In this way the stack is thickest near the middle of the blade and thinner near the root and near the tip of the blade.

Aside from the integral spar structures, the remainder of the outer shells of the respective blade modules may be made of composite material, for example glass-fibre reinforced plastic (GFRP).

According to a second aspect of the present invention, there is provided a blade module for a modular wind turbine blade, the blade module having an interface end for connecting to an interface end of a further blade module, and at least one longitudinally extending spar structure, wherein a fixed section of the spar structure is integral with an outer shell of the blade module and a free section of the spar structure extends beyond the interface end of the blade module for integration with an outer shell of the further blade module, wherein the free section is folded or coiled to facilitate transportation of the blade module.

Preferably the blade module is an inboard module having an inboard end adapted for connection to a hub of a wind turbine. The inboard end of the blade module preferably has a substantially circular profile and the interface end of the blade module preferably has an airfoil profile.

The fixed section of the or each spar structure is preferably integrally moulded with the outer shell of the blade module. The fixed section preferably extends substantially up to the interface end of the module. This prevents the spar structure from peeling away from the outer shell. Top facilitate transportation, the free section of the or each spar structure may be folded back over at least part of the fixed section of the spar structure. The free section of the or each spar structure may be retained in the folded or coiled position by retaining means.

The or each spar structure may comprise a stack of strips of reinforcing material. Preferably the or each strip is a pultruded strip of carbon fibre reinforced plastic. Preferably the strips are integrated together in the fixed section of the spar structure and are separate from one another in the free section of the spar structure. Keeping the strips separate from one another in the free section maintains the flexibility of the individual strips and facilitates folding or coiling of the free section.

The module preferably comprises one or more spar structures on a windward side of the module and one or more spar structures on a leeward side of the module. The spar structures on the windward side are preferably arranged opposite the spar structures on the leeward side. Preferably one or more shear webs are located inside the outer shell and connected between opposed spar structures.

To minimise the space taken up by the module during transportation, all of the spar structures are preferably folded or coiled on the same side of the blade.

According to a third aspect of the present invention there is provided a blade module for a modular wind turbine blade, the module having an interface end for connecting to an interface end of a further module of the modular wind turbine blade, and an outer shell in which one or more longitudinally-extending channels are defined, wherein the or each channel is configured to receive a free section of a longitudinally extending spar structure associated with the further module when the modules are connected.

In preferred embodiments of the invention, the or each channel is defined in an outer surface of the outer shell. Assembly of the blade is thereby facilitated as the channels are readily accessible so that it then becomes straightforward to position the spar structures in the corresponding channels. It is also then relatively straightforward to laminate over the spar structures, if required.

The or each channel preferably comprises an opening at the interface end of the blade module. The opening allows the spar structures to adopt a straight path across the interface between the first and second blade modules.

Preferably one or more channels are defined on a windward side of the blade module and one or more channels are defined on a leeward side of the blade module. The respective channels are preferably located opposite one another. The blade module preferably includes one or more shear webs located inside the outer shell and connected between opposed channels. The shear webs align end to end with corresponding shear webs in the further blade module when the modules are connected.

Preferably the blade module is an outboard module for connection to an inboard blade module. Preferably the blade module is a tip module and comprises an outboard end in the form of a blade tip or an outboard end adapted for connection to a blade tip. In embodiments of the invention in which there are more than two blade modules, the outboard module may alternatively be connected between an inboard module and a tip module. The interface end of the blade module preferably has an airfoil profile corresponding to the airfoil profile at the interface end of the further blade module to which the blade module connects.

Optional and preferred features described in relation to the first aspect of the invention are equally applicable to the second and third aspects of the invention and vice versa. Purely to avoid repetition, some of these features have been described above only in relation to one aspect.

According to a fourth aspect of the present invention, there is provided a method of assembling a modular wind turbine blade comprising a first blade module as described above and a second blade module, the method comprising arranging the first and second blade modules such that the interface end of the first blade module abuts an interface end of the second blade module to form an interface, and integrating the free section of the or each spar structure with the second blade module.

The method may further comprise bonding the or each spar structure to the second blade module.

The method may further comprise unfolding or uncoiling the free section of the or each spar structure before integrating the spar structure(s) with the second blade module.

In preferred embodiments of the invention, the second blade module is as described above, and the method comprises positioning the free section(s) of the or each spar structure in a respective channel defined in the outer shell of the second blade module.

As described above, the spar structures preferably comprise a stack of strips, and the strips in the free sections of the spar structures are preferably not bonded together in order to facilitate folding or coiling of the structures. Therefore, once the spar structures have been unrolled or uncoiled, the assembly method preferably comprises bonding the respective strips in the free sections together. The strips may be bonded by means of adhesive or resin infusion, for example. Once the modules have been connected together, the method may further involve overlaminating the or each spar structure. The outer surface of the blade may then be painted if required.

According to a fifth aspect of the present invention, there is provided a method of making a wind turbine blade, the method comprising: providing a first blade module as described above; providing a second blade module as described above; transporting the first and second blade modules to an assembly site; and assembling the first and second blade modules at the assembly site according to the assembly method described above.

The method may further comprise manufacturing the first blade module and/or the second blade module at a manufacturing facility located remotely from the assembly site.

The method may further comprise folding or coiling the free section of the or each spar structure before transporting the first blade module to the assembly site. This significantly reduces the space taken up by the first blade module in transit. The first and second blade modules may be transported together to the assembly site, for example on a suitable vehicle or inside a suitable container. Preferably the dimensions of the modules are such that the modules can fit inside a standard container. The length of the modules are conveniently shorter than the length of the blade when assembled. This allows longer blades to be transported than is currently possible by traditional means.

According to a sixth aspect of the present invention, there is provided a method of installing a wind turbine at an installation site, the wind turbine having at least one modular blade comprising a first blade module as described above and a second blade module as described above, and the method comprising: transporting one or more first blade modules and one or more second blade modules to the installation site; assembling the or each modular wind turbine blade at the installation site according to the assembly method described above; and connecting the or each modular wind turbine blade to a hub of the wind turbine.

BRIEF DESCRIPTION OF THE DRAWINGS

In order that the invention may be more readily understood, embodiments of the invention will now be described in more detail, by way of example only, and with reference to the following figures in which.

DETAILED DESCRIPTION OF THE PREFERRED EMBODIMENTS

Figure 1:
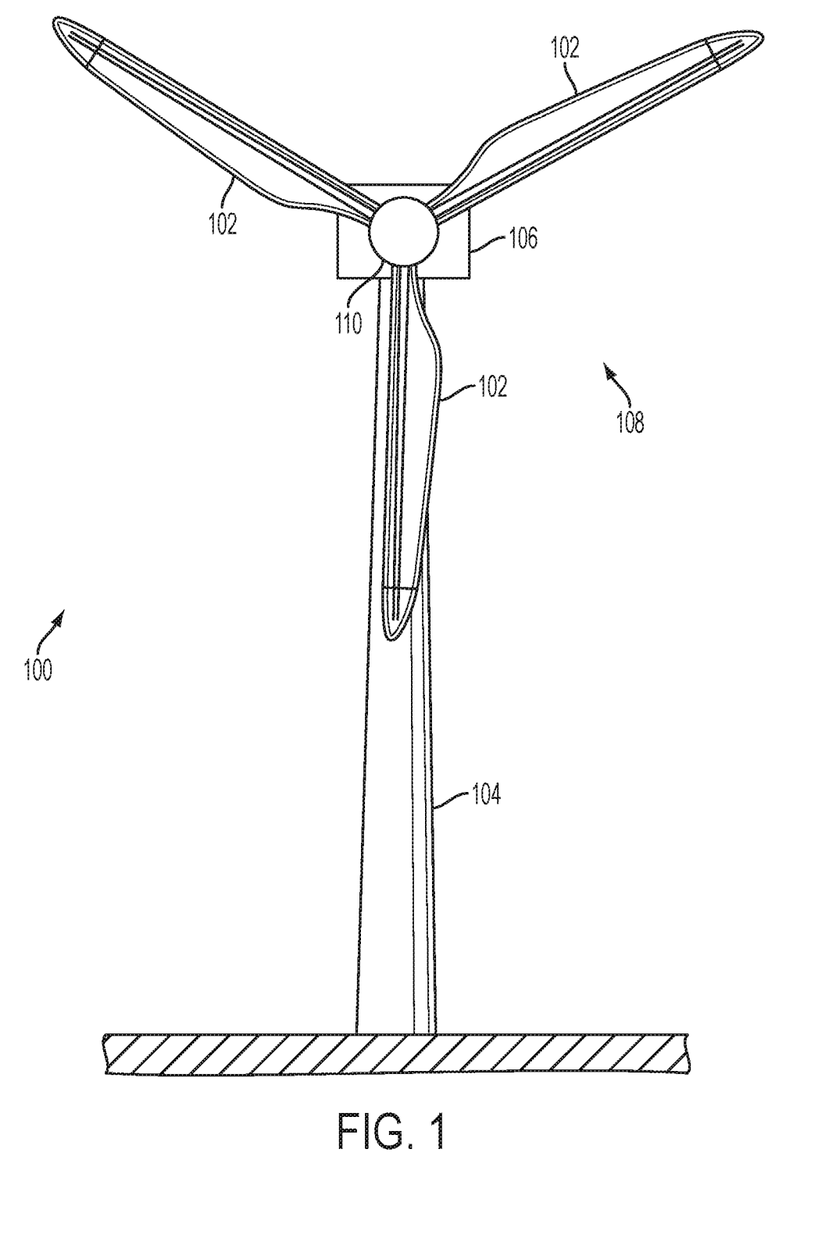
FIG. 1 is a schematic view of a wind turbine according to an embodiment of the present invention.

FIG. 1 shows a wind turbine 100 comprising three modular rotor blades 102 according to an embodiment of the invention. The wind turbine 100 comprises a tower 104 on which a nacelle 106 is supported. A rotor 108 is mounted to the front of the nacelle 106. The rotor 108 is operatively connected to a generator located inside the nacelle 106. The rotor 108 comprises a hub 110 on which the modular rotor blades 102 are mounted. The modular rotor blades 102 extend radially outward from the hub 110 and are equally spaced about a circular circumference of the hub 110.

Figure 2:
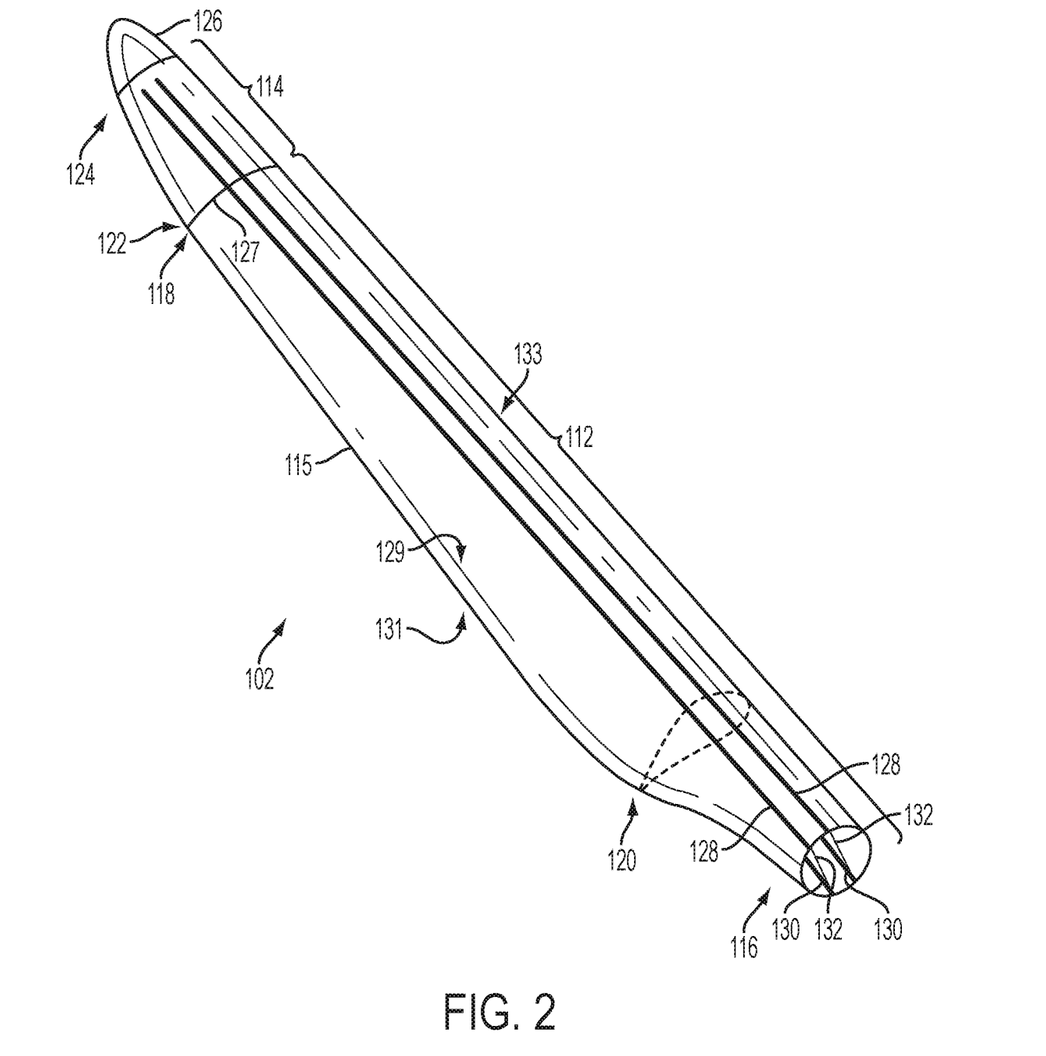
FIG. 2 is a schematic view of a modular rotor blade according to an embodiment of the present invention in which an inboard module and an outboard module are connected together by longitudinally-extending spar structures integrated with the blade shell.

FIG. 2 shows a modular rotor blade 102 of the wind turbine 100 in more detail. The modular rotor blade 102 comprises an inboard blade module 112 and an outboard blade module 114. Each module 112, 114 comprises a substantially hollow outer shell 115 made primarily of glass-fibre reinforced plastic material.

The inboard module 112 extends in a longitudinal or spanwise direction between a root end 116 and an interface end 118. The root end 116 is substantially circular and is adapted for connection to the hub 110 of the wind turbine 100. Moving from the root end 116 towards the interface end 118, the profile of the inboard module 112 smoothly transitions into an airfoil profile at a shoulder portion 120 of the blade 102, where the blade is widest, i.e. has its maximum chord. Moving further towards the interface end 118, the inboard module 112 steadily reduces in both thickness and chord. The interface end 118 itself has an airfoil profile.

The outboard module 114 extends longitudinally between an interface end 122 and a tip end 124. The interface end 122 has an airfoil profile corresponding to the airfoil profile of the interface end 118 of the inboard module 112. The tip end 124 of the module 114 is adapted for connection to a blade tip 126. In other examples of the invention the blade tip 126 may be integrated with the outboard module 114 or the tip end 124 of the module 114 may be adapted for connection to a further outboard blade module 114.

The inboard and outboard modules 112, 114 are connected together at their respective interface ends 118, 122 to form the modular blade 102. The interface or join between the modules 112, 114 is represented by the solid line 127 in FIG. 2.

The modular blade 102 further includes a plurality of longitudinally-extending spar structures 128, 130 that extend along the majority of the length of the blade 102, from the root end 116 of the inboard module 112 to a point close to the tip end 124 of the outboard module 114. A first pair of spar structures 128 is clearly shown on a leeward side 129 of the blade 102. The spar structures 128 are spaced apart in the chordwise direction and extend substantially parallel to one another along the blade 102. A corresponding pair of spar structures 130 is present on a windward side 131 of the blade 102, and the root ends of these structures are visible in FIG. 2. The windward spar structures 130 are arranged substantially opposite the leeward spar structures 128. The spar structures 128, 130 are known in the art as 'spar caps', and serve as the primary reinforcing members of the blade 102.

A pair of shear webs 132 is provided inside the blade 102. The shear webs 132 extend longitudinally inside the blade 102 and are connected between opposed spar caps 128, 130. The shear webs 132 are integrated with the inboard and outboard modules 112, 114 during manufacture of the modules, and the shear webs of the inboard module 112 are joined end to end with the shear webs of outboard module 114 when the modules 112, 114 are connected.

The spar structures 128, 130 each comprise a plurality of pultruded strips of carbon fibre reinforced polymer. The pultrusions each have a thickness of approximately 5 mm in this example and are arranged one on top of another to form a stack. The number of pultrusions in each stack varies along the length of the modular rotor blade 102 and hence the thickness of each spar structure 128, 130 varies along the length of the blade. Generally the number of pultrusions in each stack (and hence the thickness of the spar structures 128, 130) is a maximum near the middle of the blade 102 and decreases moving both towards the tip end 124 and the root end 116 of the blade 102.

In this example, the inboard module 112 is significantly longer than the outboard module 114. However, the relative lengths of the modules 112, 114 may vary in other examples. It will also be appreciated that the blade 102 may have more than two modules in other examples. As described by way of background, one of the main benefits of a modular blade is that it can be transported more easily to the wind turbine installation site. This allows longer blades to be produced because the component parts can be transported to the site and then assembled at the site. In particularly advantageous embodiments of the invention, the dimensions of the modules may be such that the modules can be transported in standard size containers.

Figure 3A:
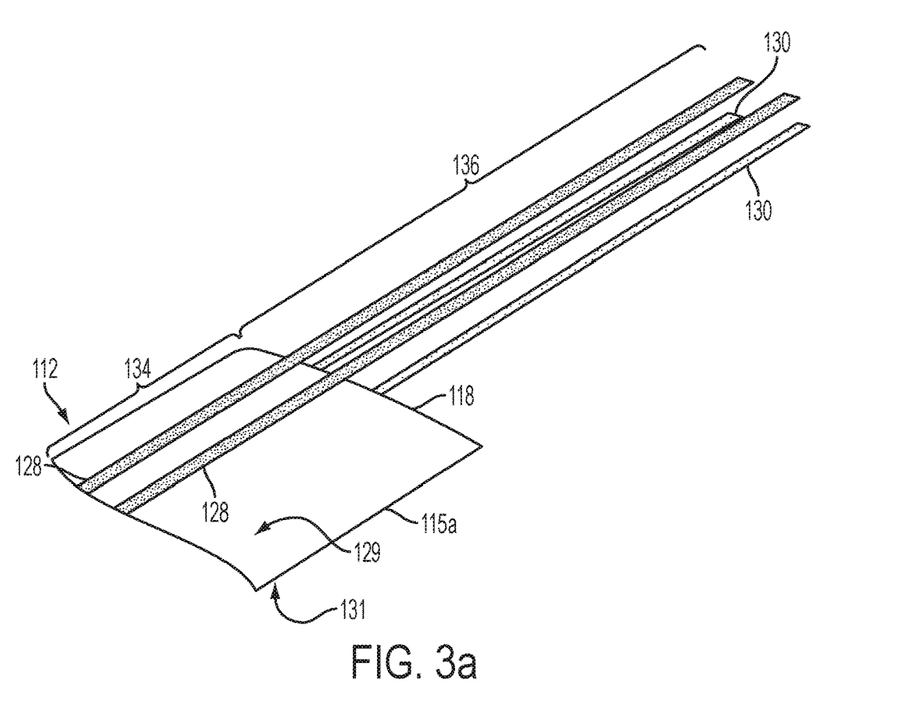
FIG. 3a is a schematic view of the inboard module of the modular rotor blade shown in FIG. 2 in which the spar structures are integrated with the inboard module and are shown extending outwards from an outer end of the inboard module.
Figure 3B:
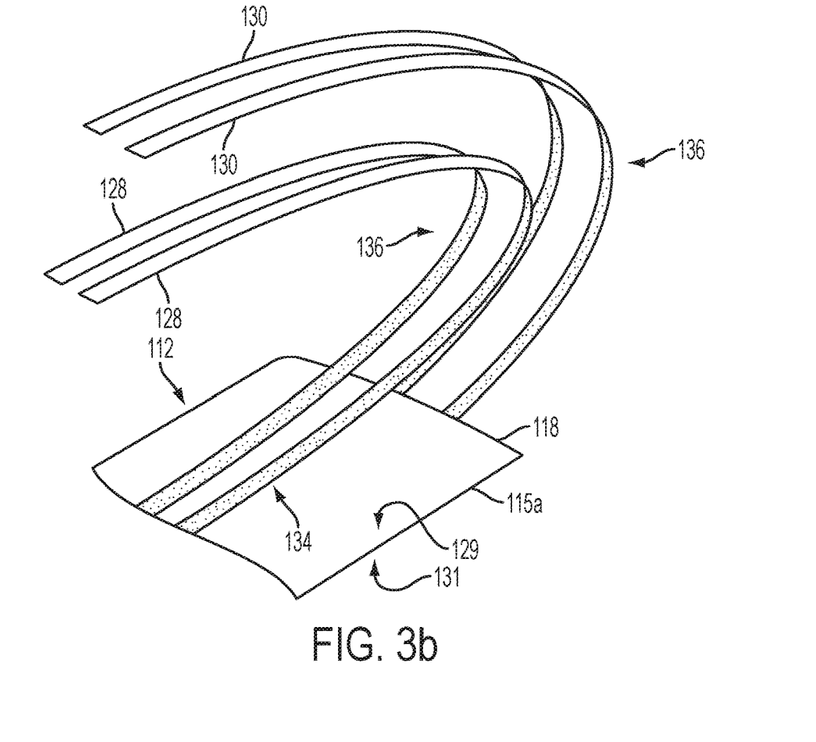
FIG. 3b is a schematic view of the inboard module of the modular rotor blade in which the spar structures are folded back to facilitate transportation.

Further details of the composition and assembly of the modules 112, 114 will now be provided with reference to FIGS. 3a and 3b of the accompanying drawings.

Referring to FIG. 3a, this shows an outer end of the inboard module 112, before it is connected to the outboard module 114 to form the modular rotor blade 102. The four longitudinally-extending spar structures 128, 130 described above with reference to FIG. 2 are integrated with the inboard module 112 during manufacture of the inboard module 112. The spar structures 128, 130 each comprise a fixed section 134 and a free section 136. The fixed sections 134 of the respective spar structures 128, 130 are integrally moulded with the outer shell 115a of the inboard module 112, and the free sections 136 of the spar structures 128, 130 extend beyond the interface end 118 of the inboard module 112.

A method of integrally moulding the spar structures 128, 130 with the shells is described in WO2006/082479 and WO2013/087078. Essentially, the spar structures 128, 130 are arranged in a suitable mould together with glass-fibre fabric layers and any other structural components of the shells, for example foam panels. The layup is then covered with a vacuum bag, which is sealed against the mould surface using sealant tape. A number of vacuum pumps are connected to the sealed cavity region between the mould surface and the vacuum bag. Resin is then admitted into the sealed cavity under vacuum, which causes the resin to infuse between the various components. The resin also infuses between the pultruded strips. Once the resin has completely infused throughout the layup, the heat is applied to the layup to cure (i.e. harden) the resin. This process is known in the art as vacuum-assisted resin transfer moulding (VARTM). Other suitable manufacturing methods would also be apparent to persons skilled in the art, for example prepreg techniques in which the fabric layers are pre-infused with resin.

Once the resin has been cured, the pultrusions in the fixed sections 134 of the spar structures 128, 130 are integrated together in the stack. However, the free sections 136 of the spar structures are not subject to the infusion process and hence the pultrusions in the free section 136 of the spar structures 128, 130 remain separate from one another. As will now be explained with reference to FIG. 3b, this is particularly advantageous because the free sections 136 of the pultruded strips remain flexible and can be folded or coiled to facilitate transportation.

Referring now to FIG. 3b, this shows the inboard module 112 with the free sections 136 of the spar structures 128, 130 smoothly folded back over the inboard module 112. The free sections 136 of the leeward spar structures 128 are folded back over the fixed sections 134 of the leeward spar structures 128 on the leeward side 129 of the blade 102. The free sections 136 of the windward spar structures 130 are folded around and over the folded free sections of the leeward spar structures 128. Accordingly, both the leeward and windward spar structures 128, 130 are folded on the leeward side 129 of the blade 102. This configuration is advantageous because it minimises the space taken up by the inboard module 112 in transit. It will be appreciated that in other embodiments, the spar structures 128, 130 may instead be folded on the windward side 131 of the blade 102.

The folded free sections 136 are restrained in transit using straps or other suitable fasteners. Alternatively or additionally, a suitable transport frame may conveniently be employed for keeping the pultruded strips of the spar structures 128, 130 securely stowed during transport. This may be in the form of a spiral coil (similar to a snail shell) into which the strips are fed. End caps (similar to chisel caps) may be provided on the ends of the pultruded strips to protect the ends during transportation.

Figure 4:
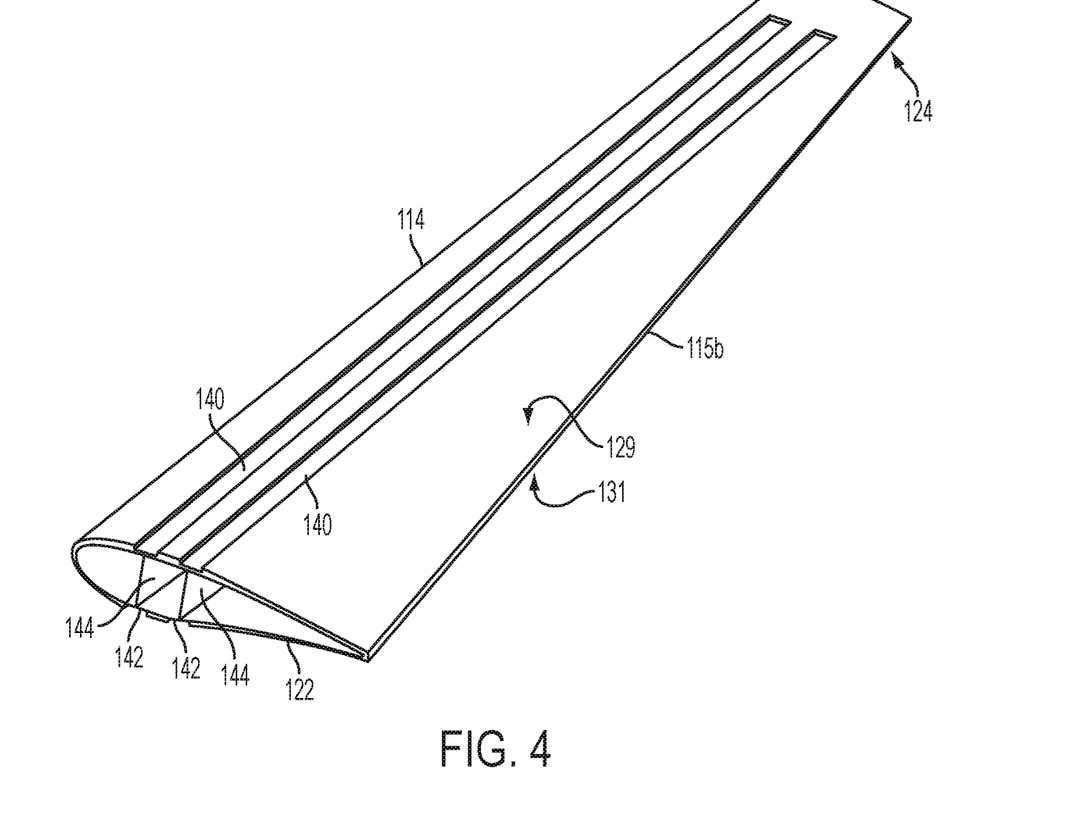
FIG. 4 is a schematic view of an outboard module of the modular rotor blade shown in FIG. 2 in which channels are defined on an outer surface of the module for receiving the spar structures.

FIG. 4 shows the outboard module 114 of the modular wind turbine blade 102 described above with reference to FIG. 2. A plurality of recessed channels 140, 142 is defined in an outer surface of the module 114. The recessed channels 140, 142 span substantially the entire length of the outboard module 114, stopping short of the tip end 124 of the module 114, and are arranged to accept the free sections 136 of the spar structures 128, 130. Accordingly, a first pair of spaced apart channels 140 is defined on the leeward side 129 of the module 114 and a second pair of recessed channels 142 is defined on the windward side 132 of the module 114 opposite the leeward channels 140. As described previously, a pair of shear webs 144 is arranged within the outboard module 114. As shown in FIG. 4, each shear web 144 is connected between opposed channels 140, 142.

The inboard and outboard modules 112, 114 are transported to a wind turbine installation site and are assembled on site to form the modular rotor blade 102. To assemble the blade 102, the inboard and outboard modules 112, 114 are arranged with their respective interface ends 118, 122 in abutment. Whilst not shown in the figures, the interface ends 118, 122 of the respective modules 112, 114 comprise a short overlap for bonding. The restraining straps securing the free sections 136 of the spar structures 128, 130 to the inboard module 112 are released and the free sections 136 of the spar structures 128, 130 are unfolded and positioned in the recessed channels 140, 142 defined in the outer shell 115b of the outboard module 114. Adhesive film is applied between the respective pultrusions in the free sections 136 of the spar structures 128, 130 to integrate the strips together. The stacks of strips are bonded in place in the respective channels using adhesive. Alternatively, resin infusion may be used to infuse the strips together and to bond the strips to the shell 115b of the outboard module 114. Adhesive is also applied to the interface surfaces of the respective modules to create a bond. The depth of the channels 140, 142 is such that the free sections 136 of the spar structures 128, 130 are substantially flush with the outer surface of the outboard module 114. The spar structures 128, 130 may then be overlaminated and the blade 102 may be painted or subjected to other finishing processes if required.

Figure 5:
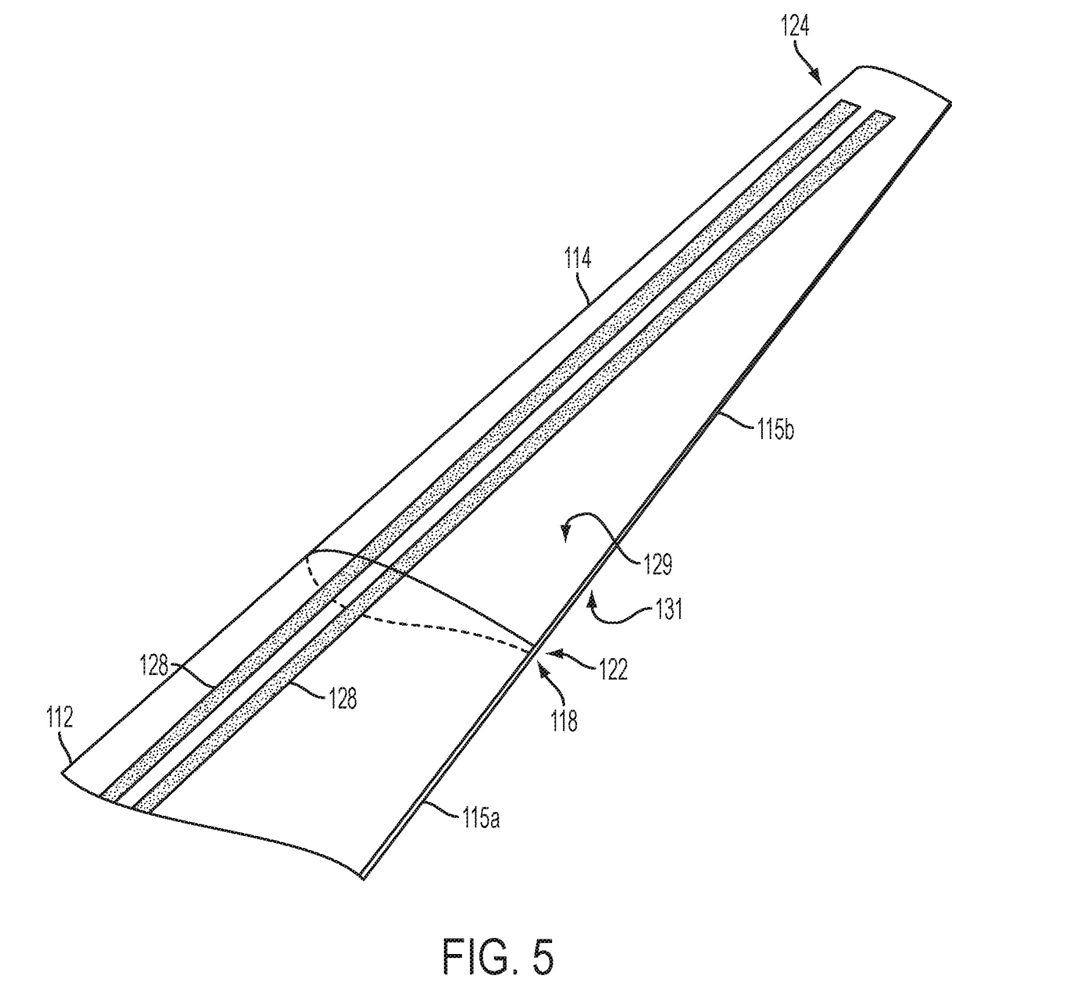
FIG. 5 shows the outboard module and the inboard module connected together.

Referring now to FIG. 5, this shows the inboard module 112 and the outboard module 114 when connected together to form the modular rotor blade 102. As already described above, the spar structures 128, 130 are integrally moulded with the outer shell 115a of the inboard blade module 112. Once bonded to the outboard module 114, the spar structures 128, 130 also form an integral part of the outer shell 115b structure of the outboard blade module 114. As can be seen in FIG. 5, the spar structures 128, 130 extend continuously along the majority of the length of the blade 102 including across the interface between the respective inboard and outboard modules 112, 114. A particular advantage of the present invention over prior art modular blade structures is that the spar structures 128, 130 do not include any joints and hence their structural integrity is maintained rather than being compromised by the modular structure of the blade. Accordingly, the spar structures 128, 130 provide a continuous load path along the length of the blade 102 that can transfer loads effectively from the tip end 124 all the way to the root end 116 of the blade 102. The spar structures 128, 130 further serve to connect the blade modules 112, 114 together securely and form a sufficiently stiff rotor blade without a significant mass penalty compared to prior art modular blades.

A further advantage of the present invention is that the recessed channels 140, 142 in the outboard module 114 serve to facilitate alignment between the respective inboard and outboard modules 112, 114 when the modules are connected. To further facilitate alignment, a tight fit may be used between the spar structures 128, 130 and the channels 140, 142.

Referring again to FIG. 3b, to further reduce the space occupied by the inboard module 112 in transit, it is desirable to be able to minimise the radius of curvature of the folded free sections 136 of the spar structures 128, 130. However, in order to prevent damage occurring to a pultrusion, the pultrusion should be folded such that the strain on the pultrusion remains within its elastic deformation range. The strain on the pultrusions should therefore be maintained below a predetermined maximum strain limit, $\varepsilon_{max}$. The strain can be derived from first principles in relation to the thickness of the pultrusions, t, and the radius of curvature of the fold, as will be understood by persons skilled in the art.

Hence, the minimum radius of curvature, $r_{min}$, which can be achieved whilst maintaining the strain on the pultrusions within the elastic deformation range can be calculated using Equation 1 below:

$$r_{min} = \frac{\frac{1}{2} \times t}{\varepsilon_{max}} \qquad \text{Equation 1}$$

To avoid damage to the pultrusions, the radius of curvature of the bend in the free sections 136 of the pultrusions is greater than or equal to the minimum radius of curvature determined by Equation 1. By way of example, if the thickness of a pultrusion is 2.5 millimetres and the maximum strain limit for the pultrusion is 3000 microstrains, the minimum radius of curvature of the bend is around 420 millimetres.

Whilst FIG. 3a shows all four spar structures 128, 130 folded back over the leeward side 129 of the inboard module 112, other configurations of stowing the spar structures 128, 130 in transit are described below with reference to FIGS. 6a-6c.

Figure 6A:
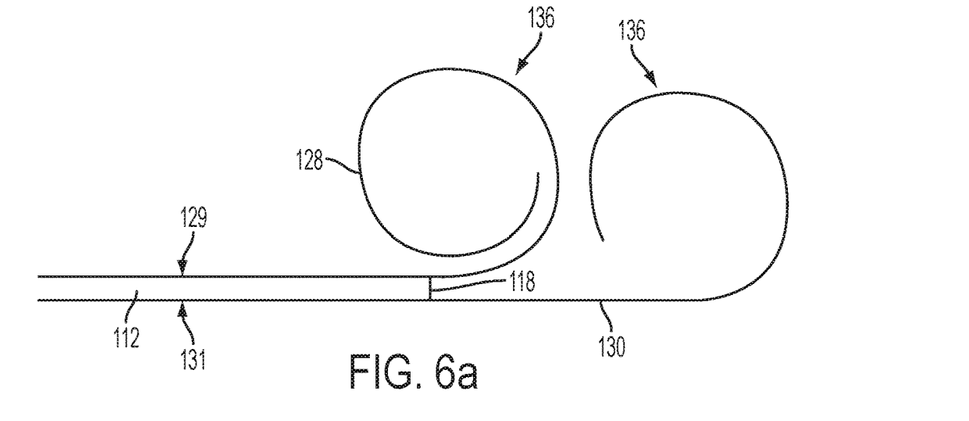
FIGS. 6a to 6c are schematic side views of the inboard module in which the spar structures are stowed in various exemplary configurations.

Referring to FIG. 6a, instead of folding the spar structures, the free sections 136 of the spar structures 128, 130 may be coiled to facilitate transportation. In FIG. 6a, the leeward spar structures 128 are formed into coils on the leeward side 129 of the module 112, and the windward spar structures 130 are also formed into coils substantially on the leeward side 129 of the blade 102 but outboard of the leeward coils. Hence, all of the spar structures 128, 130 are coiled on the same side of the blade 102.

Figure 6B:
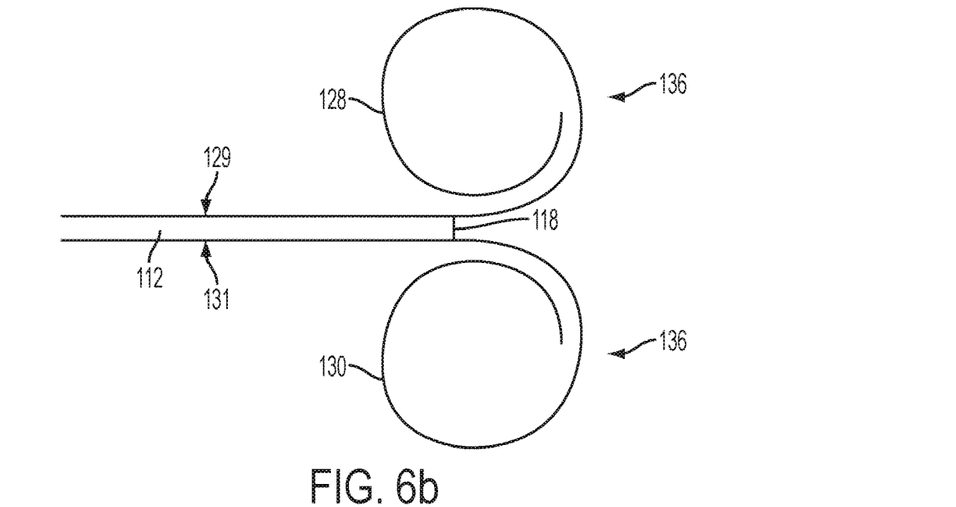

Referring to FIG. 6b, in this example the leeward spar structures 128 are coiled on the leeward side 129 of the module 112 and the windward spar structures 130 are coiled on the windward side 131 of the module 112. Hence, the spar structures 128, 130 are coiled on difference sides of the blade 102.

Figure 6C:
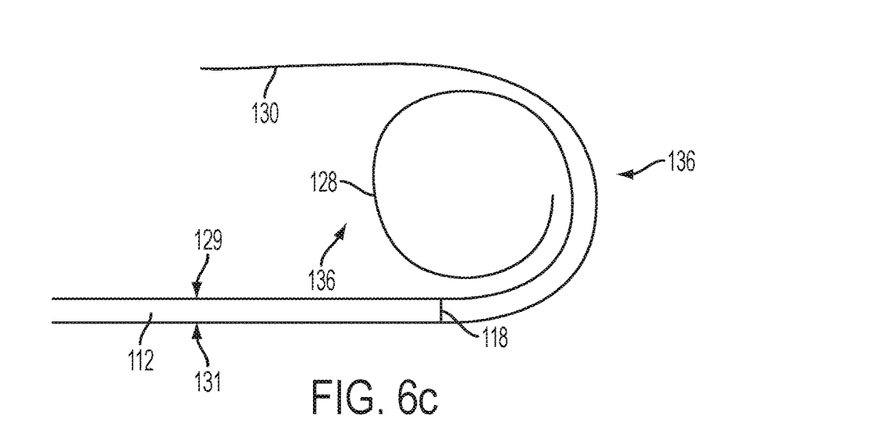

Referring to FIG. 6c, the leeward spar structures 128 are coiled on the leeward side 129 of the module 112 and the windward spar structures 130 are folded over the coiled leeward spar structures 128 on the leeward side 129 of the module 112. Hence, all of the spar structures 128, 130 are either folded or coiled on the same side of the blade 102.

Other configurations of folding and/or coiling the spar structures will be apparent to the skilled person.

Many modifications may be made to the above examples without departing from the scope of the present invention as defined in the accompanying claims.

Whilst the spar structures 128, 130 described above comprise pultrusions, in other embodiments of the invention other suitable pre-cured components could be used, such as cured sheet material or belt-pressed composites.

Whilst in the embodiments described above, the blade comprises a separate blade tip 126 connected to the tip end 124 of the outboard blade module 114, in other examples of the invention, the outboard blade module 114 may include an integral blade tip.

The inboard module 112 may be compatible with a plurality of outboard modules which vary in parameters such as length, airfoil cross section and/or twist. Different modular rotor blades may be produced comprising the same inboard module but different outboard modules. The different outboard modules may be designed to optimise energy capture of the modular rotor blade for wind turbines operating in different conditions experienced at different sites.

Interchangeable modules can be used to change the blade length, change the level of prebend and include different options on the blade (e.g. de-icing, winglet, different geometries for different wind classes).

The invention claimed is:

1. A modular wind turbine blade comprising:
   a first blade module and a second blade module for connection end to end such that an interface is defined between the first blade module and the second blade module, each of the first blade module and the second blade module having a outer shell formed of a composite material; and
   at least one longitudinally extending spar structure forming part of the outer shells of the first blade module and the second blade module when the modules are connected,
   wherein the or each longitudinally extending spar structure is continuous and extends across the interface between the first blade module and the second blade module when the modules are connected,
   wherein the composite outer shell of the second blade module comprises one or more longitudinally extending recessed channels formed in an outer surface of the composite outer shell, the recessed channels respectively receiving the or each longitudinally extending spar structure when the first blade module and the second blade module are connected together; and
   wherein the or each recessed channel includes opposing sidewalls and a supporting surface extending between the opposing sidewalls, the opposing sidewalls and the supporting surface being defined by, integral with, and embedded within the composite material of the outer shell, and the supporting surface having a width that is at least coextensive with a width of a respective longitudinally extending spar structure.

2. The modular wind turbine blade of claim 1, wherein the or each longitudinally extending spar structure is integrated with the first blade module before the first blade module and the second blade module are connected together.

3. The modular wind turbine blade of claim 1, wherein the or each longitudinally extending spar structure is integrally moulded with the outer shell of the first blade module.

4. The modular wind turbine blade of claim 1, wherein the or each longitudinally extending spar structure is folded or coiled before the first blade module and the second blade module are connected together.

5. The modular wind turbine blade of claim 1, wherein the or each longitudinally extending spar structure is bonded to the second blade module.

6. The modular wind turbine blade of claim 1, wherein the first blade module is an inboard module having an inboard end adapted for connection to a wind turbine hub.

7. The modular wind turbine blade of claim 6, wherein the second blade module is an outboard module located radially outwards from the inboard module.

8. The modular wind turbine blade of claim 1, wherein the second blade module comprises a blade tip or is adapted for connection to a blade tip.

9. The modular wind turbine blade of claim 1, wherein the or each longitudinally extending channel has a depth such that when the or each longitudinally extending spar structure is received in the corresponding longitudinally extending channel, the or each longitudinally extending spar structure is flush with an outer surface of the second blade module.

10. The modular wind turbine blade of claim 1, wherein the at least one longitudinally extending spar structure comprises one or more longitudinally extending spar structures on a windward side of the modular wide turbine blade and one or more longitudinally extending spar structures on a leeward side of the blade, the or each windward longitudinally extending spar structure being located opposite the or each leeward longitudinally extending spar structure.

11. The modular wind turbine blade of claim 10, wherein the one or more windward longitudinally extending spar structures comprises a first pair of longitudinally extending spar structures spaced apart from one another in a chordwise direction and the one or more leeward longitudinally extending spare structures comprises a second pair of longitudinally extending spar structures spaced apart in a chordwise direction.

12. The modular wind turbine blade of claim 10, further comprising one or more shear webs inside the modular wind turbine blade and connected between the one or more windward longitudinally extending spar structures and the one or more leeward longitudinally extending spar structures.

13. The modular wind turbine blade of claim 1 wherein the or each longitudinally extending spar structure varies in thickness longitudinally along the modular wind turbine blade.

14. The modular wind turbine blade of claim 1, wherein the or each longitudinally extending spar structure comprises one or more strips of fibrous reinforcing material.

15. The modular wind turbine blade of claim 14, wherein the one or more strips of fibrous material of reinforcing material comprises a stack of strips of fibrous reinforcing material.

16. The modular wind turbine blade of claim 15, wherein the stack of strips of fibrous reinforcing material has a number of strips, the number of strips in the stack of fibrous reinforcing material varies along a length of the or each longitudinally extending spar structure.

17. The modular wind turbine blade of claim 14, wherein the or each strip of fibrous reinforcing material is a pultruded strip of carbon-fibre reinforced plastic material or glass-fibre reinforced plastic material.

18. The modular wind turbine blade of claim 1, wherein the or each longitudinally extending spar structure extends along a majority of a length of the modular wind turbine blade.

19. A blade module for a modular wind turbine blade, the blade module having an interface end for connecting to an interface end of a further blade module of the modular wind turbine blade, and a outer shell formed of a composite material, the outer shell includes one or more longitudinally extending recessed channels formed in an outer surface of the composite outer shell, wherein the or each longitudinally extending recessed channel is configured to receive a free section of a longitudinally extending spar structure associated with the further blade module when the blade module and the further blade module are connected, and
   wherein the or each recessed channel includes opposing sidewalls and a supporting surface extending between the opposing sidewalls, the opposing sidewalls and the supporting surface being defined by, integral with, and embedded within the composite material of the outer shell, and the supporting surface having a width that is at least coextensive with a width of a respective longitudinally extending spar structure.

20. The blade module of claim 19, wherein the or each longitudinally extending channel comprises an opening at the interface end of the blade module.

21. The blade module of claim 19, wherein one or more of said longitudinally extending channels are defined on a windward side of the blade module and one or more of said longitudinally extending channels are defined on a leeward side of the blade module, the one or more of said windward longitudinally extending channels being located opposite the one or more of said leeward longitudinally extending channels.

22. The blade module of claim 19, wherein the blade module is an outboard module for connection to an inboard blade module.

23. The blade module of claim 19, wherein the blade module comprises an outboard end in the form of a blade tip or adapted for connection to a blade tip.

24. A modular wind turbine blade comprising:
a first blade module and a second blade module for connection end to end such that an interface is defined between the first blade module and the second blade module, each of the first blade module and the second blade module having a composite outer shell; and
at least one longitudinally extending spar structure forming part of the outer shells of the first blade module and the second blade module when the modules are connected,
wherein the or each longitudinally extending spar structure is continuous and extends across the interface between the first blade module and the second blade module when the modules are connected,
wherein the composite outer shell of the second blade module comprises one or more longitudinally extending recessed channels formed in an outer surface of the composite outer shell, the one or more recessed channels includes opposing side walls and a supporting surface being defined by, integral with, and embedded within the composite outer shell, the recessed channels respectively receiving the or each longitudinally extending spar structure when the first blade module and the second blade module are connected together; and
wherein the or each recessed channel spans a majority of the length of the second blade module.

25. The modular wind turbine blade of claim 24 wherein the recessed channel terminates adjacent a tip of the second blade module.

26. A modular wind turbine blade comprising:
a first blade module and a second blade module for connection end to end such that an interface is defined between the first blade module and the second blade module, each of the first blade module and the second blade module having a composite outer shell; and
at least one longitudinally extending spar structure forming part of the outer shells of the first blade module and the second blade module when the modules are connected,
wherein the or each longitudinally extending spar structure is continuous and extends across the interface between the first blade module and the second blade module when the modules are connected,
wherein the composite outer shell of the second blade module comprises one or more longitudinally extending recessed channels formed in an outer surface of the composite outer shell, the one or more recessed channels includes opposing side walls and a supporting surface being defined by, integral with, and embedded within the composite outer shell, the recessed channels respectively receiving the or each longitudinally extending spar structure when the first blade module and the second blade module are connected together; and
wherein the longitudinally extending spar structure of the second blade module is formed solely by a continuous extension of the longitudinally extending spar structure from the first blade module.

* * * * *